United States Patent [19]

Matsunawa et al.

[11] Patent Number: 4,841,361
[45] Date of Patent: Jun. 20, 1989

[54] COLOR IMAGE PROCESSING APPARATUS

[75] Inventors: Masahiko Matsunawa; Hiroyuki Yamamoto, both of Hachioji, Japan

[73] Assignee: Konica Corporation, Tokyo, Japan

[21] Appl. No.: 128,276

[22] Filed: Dec. 3, 1987

[30] Foreign Application Priority Data

Dec. 3, 1986 [JP] .......................................... 61-288311
Dec. 3, 1986 [JP] .......................................... 61-288313

[51] Int. Cl.$^4$ ........................ G03F 3/08; H04N 1/46
[52] U.S. Cl. ........................................ 358/80; 358/75
[58] Field of Search .............. 358/75, 75 IJ, 78, 79, 358/80

[56] References Cited

U.S. PATENT DOCUMENTS

| 2,598,504 | 5/1952 | Carlson | 358/75 |
| 4,261,011 | 4/1981 | Knop | 358/75 |
| 4,415,925 | 11/1983 | Tamura | 358/75 |
| 4,510,524 | 4/1985 | Kurata | 358/75 |
| 4,535,413 | 8/1985 | Shiota et al. | 358/80 |
| 4,546,381 | 10/1985 | Kurata et al. | 358/75 |
| 4,553,172 | 11/1985 | Yamada et al. | 358/75 |
| 4,591,905 | 5/1986 | Noguchi | 358/75 |
| 4,623,917 | 11/1986 | Noguchi | 358/80 |
| 4,689,666 | 8/1987 | Hatanaka | 358/75 |

FOREIGN PATENT DOCUMENTS

| 58-142675 | 8/1983 | Japan | 358/75 |
| 58-150371 | 9/1983 | Japan | 358/80 |
| 60-63197 | 4/1985 | Japan | 358/75 |
| 60-148280 | 8/1985 | Japan | 358/75 |
| 60-180378 | 9/1985 | Japan | 358/75 |

Primary Examiner—James J. Groody
Assistant Examiner—Randall S. Svihla
Attorney, Agent, or Firm—Jordan B. Bierman

[57] ABSTRACT

In the color image processing apparatus according to the invention which reads an image on an original, generates a plural sets of color image components and extract color signal based on the color image components, to eliminate a density fluctuation in such color image processing, the density treatment is performed simultaneously with the color ghost treatment.

7 Claims, 15 Drawing Sheets

FIG. 11
11-A
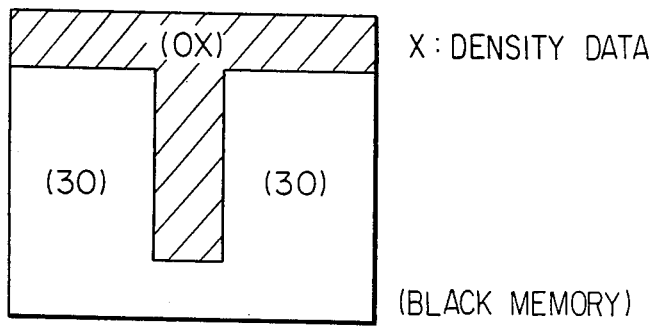
X: DENSITY DATA
(BLACK MEMORY)
11-B
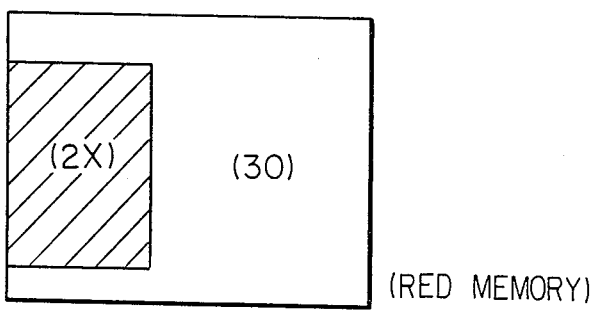
(RED MEMORY)
11-C
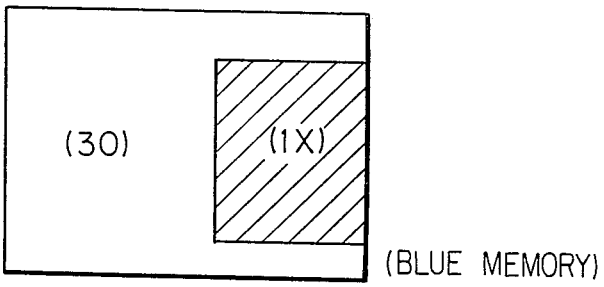
(BLUE MEMORY)
FIG. 12
| INPUT CODE | OUTPUT P2 | |
|---|---|---|
| | L | H |
| 0 0 (BK) | 0 0 | 1 1 |
| 0 1 (B) | 0 1 | 1 1 |
| 1 0 (R) | 1 0 | 1 1 |
| 1 1 (W) | 1 1 | 1 1 |

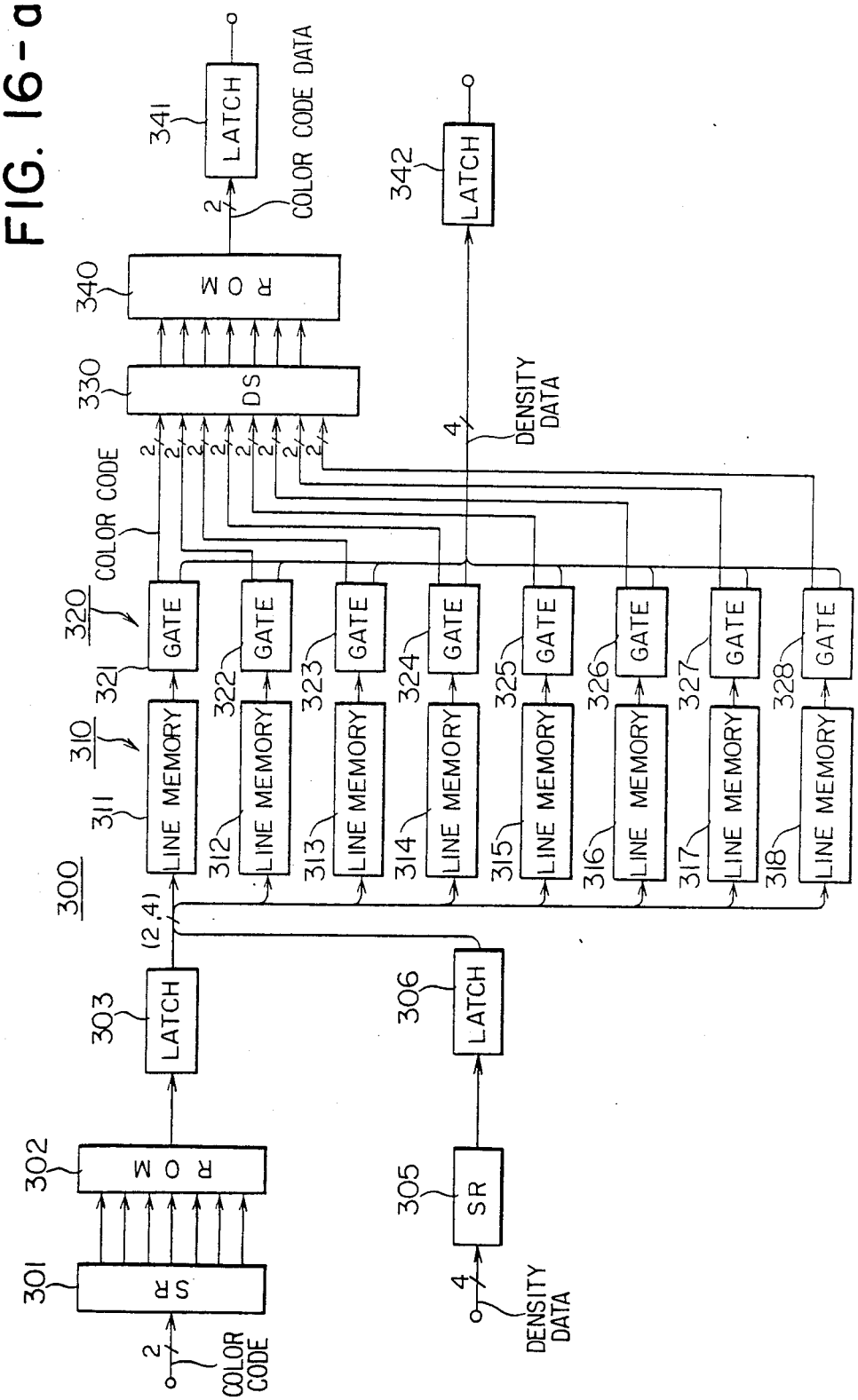
FIG. 16-a

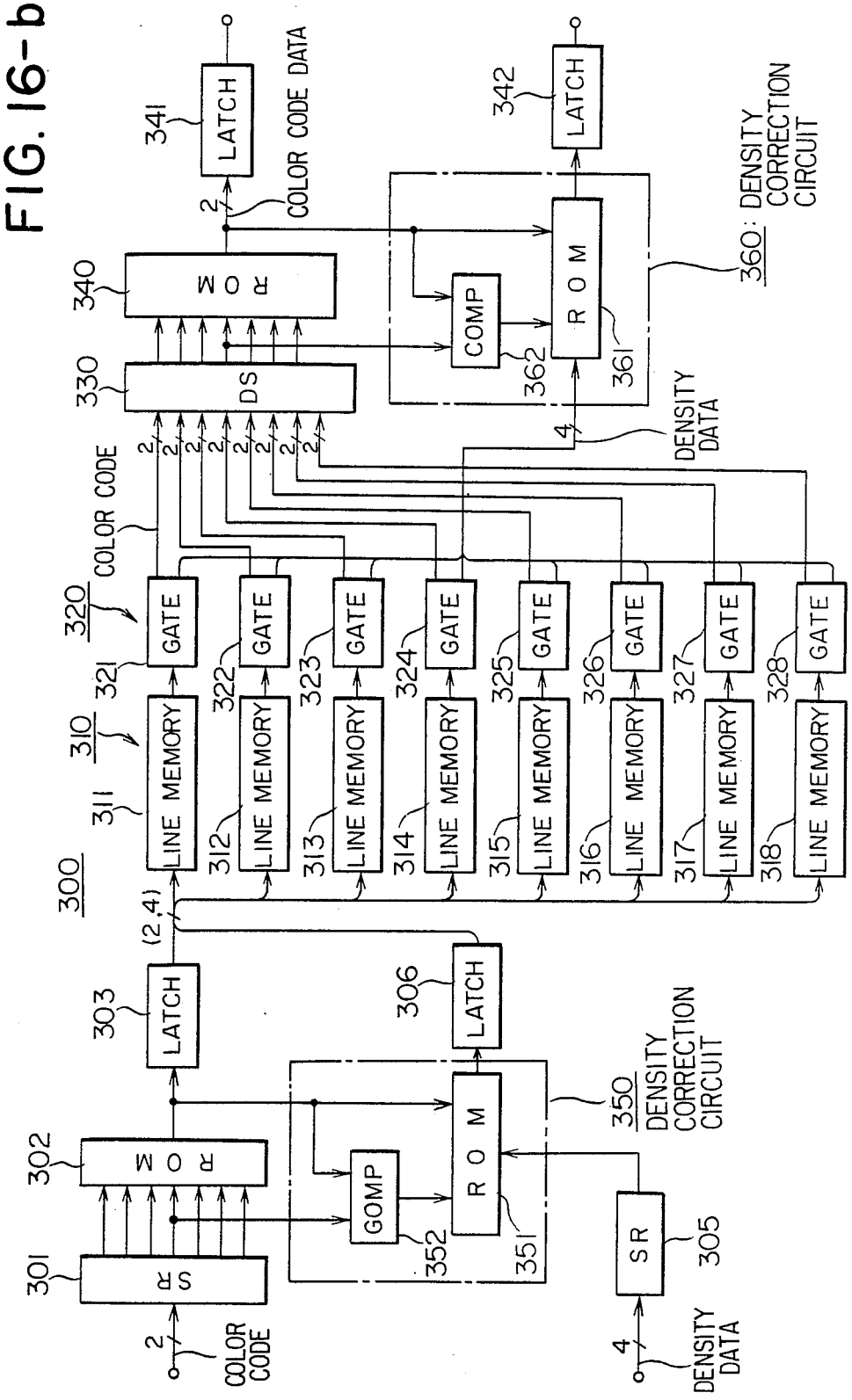
FIG.16-b

| COLOR PATTERN | | | | | | | COLOR ALTERATION OF TARGET PIXEL | |
|---|---|---|---|---|---|---|---|---|
| W | W | B | B | BK | R | W | B → | BK |
| W | W | B | B | BK | BK | BK | B → | BK |
| W | W | B | B | B | W | W | B → | B |
| W | W | W | R | BK | BK | BK | R → | BK |
| W | W | R | R | R | W | W | R → | R |

PERIPHERY PIXEL  PERIPHERY PIXEL

TARGET PIXEL

FIG. 20

|  | P1 | P2 | P3 | P4 |
|---|---|---|---|---|
| WHITE | 0 | 0 | 0 | 1 |
| GRAY | 0 | 1 | 0 | 0 |
| BLACK | 1 | 1 | 1 | 0 |

FIG. 21

| N | M | NUMBER OF COLOR PATTERN |
|---|---|---|
| 2 (W BK) | 3 | 8 |
|  | 5 | 32 |
|  | 7 | 128 |
| 3 (W BK R) | 3 | 27 |
|  | 5 | 243 |
|  | 7 | 2187 |
| 4 (W BK R B) | 3 | 64 |
|  | 5 | 1024 |
|  | 7 | 16384 |
|  | 9 | 262144 |

COLOR IMAGE PROCESSING APPARATUS

BACKGROUND OF THE INVENTION

The present invention relates to a color image processing system which is provided with a color-ghost elimination function and advantageously applied to a simple electrophotographic color copying apparatus and the like.

A color image processing apparatus, wherein image information on an original document or the like is optically read out and recorded on a recording paper by means of an output device such as an electrophotographic color copying apparatus, has been already known.

When using an electrophotographic color copying apparatus as an output device, color image information on an original document or the like is usually separated into a plural types of independent color information (including a non-chromatic type), thereby based on such color information, an independent electrostatic latent image is formed, developed and fixed.

Incidentally, such a color image processing apparatus uses a plurality of photoelectrical conversion elements such as CCDs which serve as means for reading image information, in order to acquire a plural types of information for the corresponding number of colors. If the independent color images respectively read by corresponding CCDs are misaligned with each other, specific color information Ls outputted as different color information.

Such misalignment results in the occurrence of color ghost. A color-ghost also occurs if a power of optical lens is misadjusted, a lens has large chromatic aberration, or noise components other than image signal are involved in the CCD output.

The above-mentioned color image processing apparatus is provided with a color-ghost elimination circuit for eliminating a color-ghost occurring by these reasons.

The color-ghost elimination process is performed referring not only to the pixels to be subjected to color-ghost elimination process but to color information of a plural pixels adjacent the former pixels. In other words, the color-ghost elimination process is performed based on a color pattern constituted with a specific number of pixels.

When using a color pattern composed of a specific number of pixels as mentioned above to eliminate color-ghost, and assuming that a number of types of separated, independent color information is N and a number of pixels to be referred to is M, the ghost elimination process for an object pixel (a pixel being subjected to ghost elimination process) by using M sets of pixels requires at least $$N^M$$

sets of color patterns to be referred to.

Accordingly, the numbers of color patterns required, when N=2 to 4, and M=3 to 9, will be as listed in FIG. 21.

A color-ghost occurs when N=3 or larger. Accordingly, a color-ghost is eliminated by providing a number of color patterns to be referred to as listed in FIG. 21.

A smaller number of M is advantageous. However, a larger M may correct an image having a larger ghost. Correspondingly, an ideal M is 7 to 9.

However, if setting value of M at larger value such as 9 and setting value of N at round 4 which means that there are 4 kinds of color to be recorded, the color pattern to be prepared becomes too numerous. Since such color patterns are to be stored in ROM, it may be necessary for above setting to prepare the large ROM in memory capacity. Therefore, the large ROM may incur high cost.

And, such method, has a disadvantage, density readily fluctuates in the course of multi-value conversion, since the method effects the correction only to color codes, not to density information for respective colors.

SUMMARY OF THE INVENTION

Therefore, the present invention positively solves such a problem with an prior art by using a simply constituted system which satisfactorily eliminates a color-ghost without necessitating an increased number of color patterns, and provides a color image processing apparatus wherein the density fluctuation arisen in color-ghost elimination is reduced.

To solve the above-mentioned problem, the color image processing apparatus according to the invention which reads an image on an original and generates a plural sets of independent color image, wherein not only color-ghost elimination but density processing are performed after the color extraction.

The color-ghost elimination is performed exclusively with color code data among color information.

Once a color-ghost occurs, a density value which original color information has differs a density of color information which results from the color-ghost. Accordingly, in the present invention in the color-ghost elimination process, not only color information but the density value of similar information are corrected.

This arrangement reduces the fluctuation in density especially on the edge portion of image, and provides a more natural, sharper color image.

The color-ghost elimination process complies with the following concept.

With FIG. 21, when M=5, it is possible to eliminate a color-ghost for one pixel; when M=7, for two pixels. Accordingly, if M=7, performing color-ghost elimination process twice can effect color-ghost correction almost equivalent to the correction with M=9. If M=7, the number of color patterns to be prepared is much smaller than that of M=9. This means an ROM having a smaller capacity satisfies the same job.

BRIEF DESCRIPTION OF THE DRAWINGS

FIGS. 11-A through 11-C (collectively FIG. 11) respectively illustrate a status how relevant data is stored in a memory, and these diagrams are used for describing the operation of the color extraction circuit in FIG. 10.

FIG. 12 is a truth table of a white code generator.

FIG. 16-a and 16-b are block diagrams schematically illustrating a typical example of a color-ghost elimination circuit.

FIG. 20 is a logical table used to describe the operation of a color extraction circuit in FIG. 19.

FIG. 21 is a diagram illustrating a conventional color-ghost elimination process.

DETAILED DESCRIPTION OF THE INVENTION

A color image processing apparatus employed in implementing the present invention is hereinunder described in detail with reference to FIG. 1 onward.

However, the example below embodying the invention is an example where the invention is applied to a color image processing apparatus which uses an electrophotographic color copying apparatus as an output device.

Figure 1:
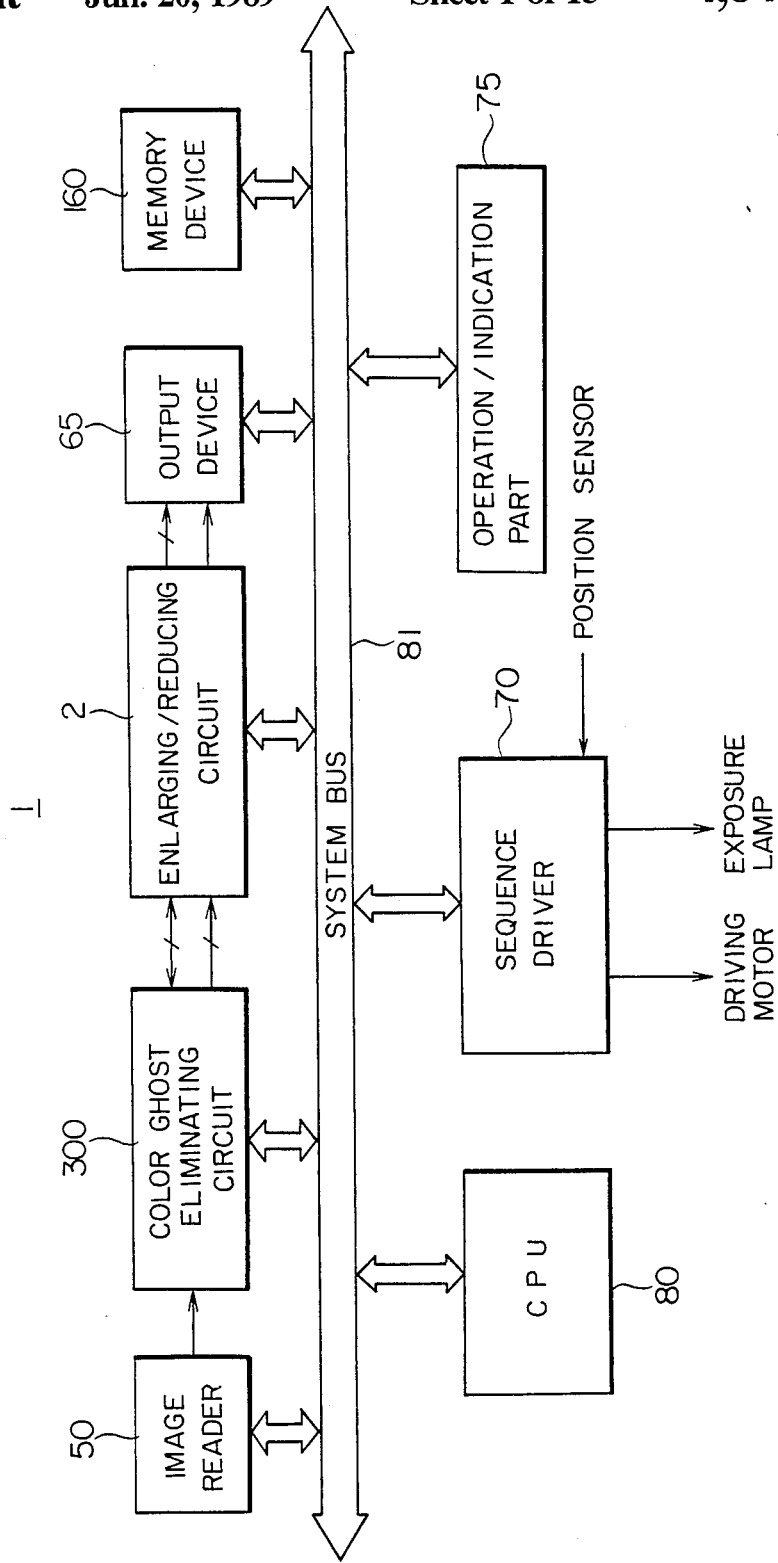
FIG. 1 is a diagram schematically illustrating a color image processing apparatus according to the invention.

Accordingly, the general constitution of a color image processing apparatus embodying the present invention is first described referring to FIG. 1.

At an image reading device 50, image information of an original document or the like is subjected to image processing such as shading correction, color separation, A/D conversion and the like, and converted into image data which corresponds with independent color signal and composed of a specific number of bits expressed for example in 16-tone notation (0 through F).

Image data of each independent color is composed of density information and color code data. These image data are supplied to a color-ghost elimination circuit 300, which executes color-ghost elimination. When image data is composed of density information and color code data, what is subjected to color-ghost elimination may be only color code data or both color code data and density information.

Independent image data having undergone color-ghost elimination is subjected to image processing such as enlarging or reducing based on for example a linear interpolation method. In this case, the interpolation data used as post-enlargement/reduction image data is stored in an interpolation data table (interpolation ROM), thereby, as signals to select this interpolation data, pre-enlargement/reduction image data, as well as interpolation selection data stored in a data ROM are used. Required interpolation selection data is selected based on a command from a system control circuit 80 in compliance with a specified scale ratio.

After image processing, the image data is supplied to an output device 65, where an image is recorded in an externally designated scale ratio. As the output device 65, an electrophotographic color copying apparatus is used.

Image data generated by the image reading device 50, or otherwise, image data following the image processing, is recorded by a memory 160.

The image reading device 50 is provided with a motor which drives the image reading device 50, as well as an exposure lamp or the like. These components are controllingly driven at a predetermined timing by a command signal from a sequence control circuit 70. To the sequence control circuit 70 is inputted data from a position sensor (unshown).

At the control/display portion 75, various input data such as a designated scale ratio, designated recording position, designated recording color or the like are inputted, and a display means displays the contents of inputted data. An LED element for example is used as the display means.

Above various controlling steps, controlling for whole image processing system, as well as controlling for status of various areas in the system, are controlled by means of a system control circuit 80. Accordingly, it is advantageous to perform the system control by means of a microcomputer.

What is illustrated in FIG. 1 is one example of controlling with a microcomputer, wherein a system bus 81 connects between the control circuit 80 and the various circuits mentioned above, so that necessary image processing data as well as control data are transferred.

To the image reading device 50 are supplied an image reading start signal, shading correction start signal, recording color designation signal and the like, via the system bus 81.

Data corresponding with a scale ratio designated with the control/display portion 75, as well as other data, are first fed into the control circuit 80, and finally supplied to an enlarging/reducing circuit 2 via the system bus 81.

Incidentally, it is possible for this enlarging/reducing circuit 2 to binary-code the image data. According to the invention, however, the binary coding process is performed in the image reading device 50 side.

When binary-coding the image data, the threshold value data for binary-coding operation may be selected based on the type, density or the like of the image to be recorded. A signal bearing a command for selecting the threshold data is supplied via the system bus 81.

To the output device are supplied an image recording start signal, recording paper size selection signal and the like.

Next, these constituents are described in detail.

Figure 2:
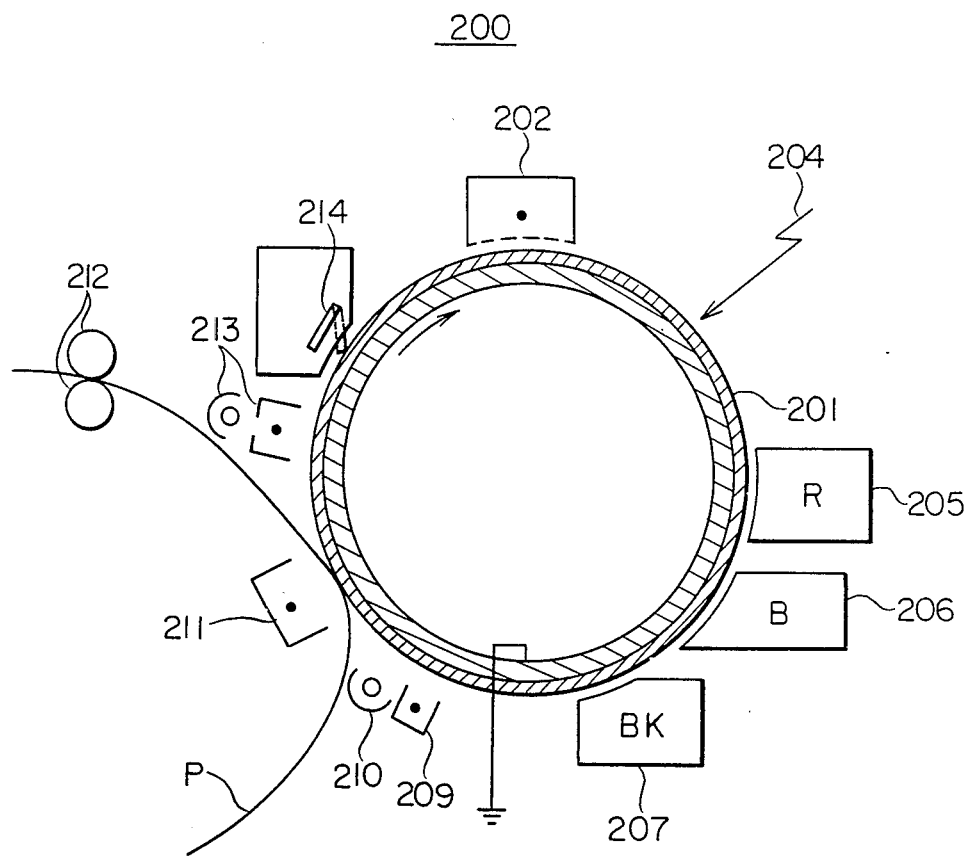
FIG. 2 illustrates a constitution of one example of a simple, electrophotographic color copying apparatus.

To allow better understanding of the present invention, one example of a simple-constituted color copying apparatus is hereinunder described referring to FIG. 2.

The color copying apparatus illustrated here is intended for recording a color image by separating original color information into three types of independent color information. As mentioned above, three types of independent color information are black BK, red R, and blue B.

In FIG. 2, reference numeral 200 represents one example of principal area of color copying apparatus, wherein reference numeral 201 represents a drumshaped image carrying member of which surface is a photoconductive member layer made of selenium, OPC (organic semiconductor) or the like, and onto which an electrostatic latent image in corresponding with an optical image is formed.

Around the surface of the image-carrying member 201, and along the direction of rotation, are disposed the following members which are sequentially described.

Following imagewise exposing, an electrostatic latent image is developed by an associated developing unit. The number of disposed developing units corresponds with the number of independent color images. In this copying apparatus are disposed, along the rotating direction of the image-carrying member 201 and facing the surface thereof, three developing units in the order of a developing unit 205 containing a developer having a red toner, a developing unit 206 containing a developer having a blue toner, and a developing unit 207 containing a developer having a black toner.

The developing units 205 through 207 are sequentially and selectively driven in conjection with the rotation of the image-carrying member 201. For example, when the developing unit 207 is selectively driven, an electrostatic latent image which based upon an independent black image is developed by depositing toner and makes a positive black image.

On the developing unit 207 are disposed a pre-transfer electrifying unit 209 and a pre-transfer exposure lamp 210, both of which enable the color image to be readily transferred onto a recording member P. However, either pre-transfer electrifying unit 209 or the pre-transfer exposure lamp 210 is disposed according to a specific requirement.

A developed color image or monochromatic image on the image-carrying member 201 is transferred onto the recording paper P by a fixing unit 211. The recording paper P bearing a transferred image is next subjected to the fixing process which uses a fixing unit 212, then ejected outside.

A neutralizing unit 213 is composed of any of both of a neutralizing lamp and neutralizing corona discharging unit, and each of which is disposed according to a specific requirement.

A cleaning device 214 is composed of a cleaning blade, fur brush and the like. The cleaning device 214 removes a residual toner present on the surface of drum even after the color image has been transferred from the image-carrying member 201.

It is well known in the art that, in the toner removal, the cleaning device 214 is well away from the surface of image-carrying member 201 until the area having been subjected to developing reaches the area onto which the device comes into contact.

As the electrifying unit 202, a Scorotron corona discharger or the like is available. This is because such a discharger is relatively free from the adverse effect of former electrification, and capable of providing the surface of image-carrying member 201 with a stable triboelectricity.

As the image exposure light 204, an image exposure light generated by a laser beam scanner may be used. This is because a laser beam scanner enables a sharp color image to be recorded.

At least in the second development onward which are repeated to form color images overlappingly, it is compulsory that a toner deposited on the image-carrying member in a proceeding development is not shifted in next development. For this reason, the development should be preferably performed in compliance with the non-contact jumping development system.

The developing units in FIG. 2 are those in compliance with the non-contact jumping development system.

The preferred developer is the so-called two-component developer. This is because a two-component developer has a brilliant hue, and allows each charging for a toner.

Figure 3:
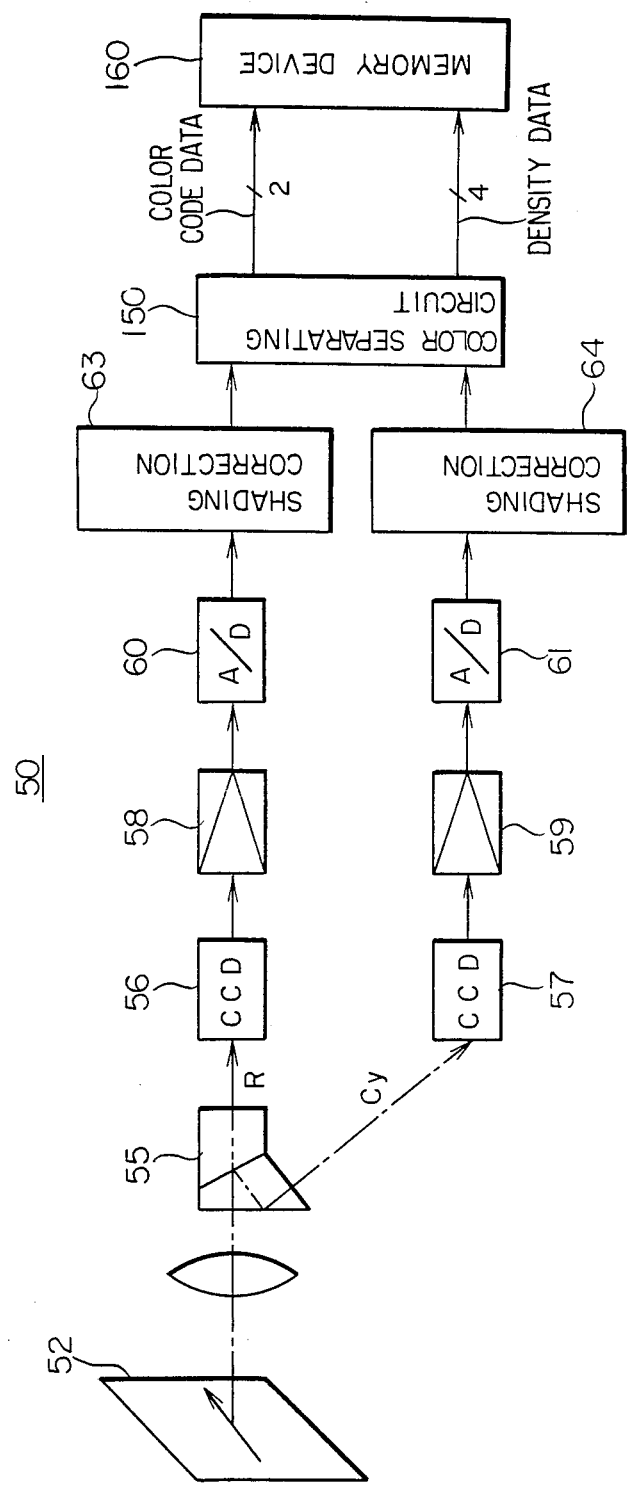
FIG. 3 is a diagram schematically illustrating one example of an image reading device.

FIG. 3 illustrates an example configuration of an image reading device 50.

According to the figure, color image information (optical image) of an original document 52 is separated into two independent color images by a dichroic mirror 55; in this example, into an independent red image R and an independent cyan image Cy. Accordingly, the dichroic mirror 55 used has a cutoff of 540 to 600 mm. This arrangement makes the red component a transmitted light, and the cyan component a reflected light.

Independent red R and cyan Cy images are directed correspondingly to image reading means 56 and 57 respectively composed of a CCD or the like, thereby the image reading means 56 outputs an image signal solely composed of the red component R, and the image reading means outputs an image signal solely composed of the cyan component Cy.

Figure 4:
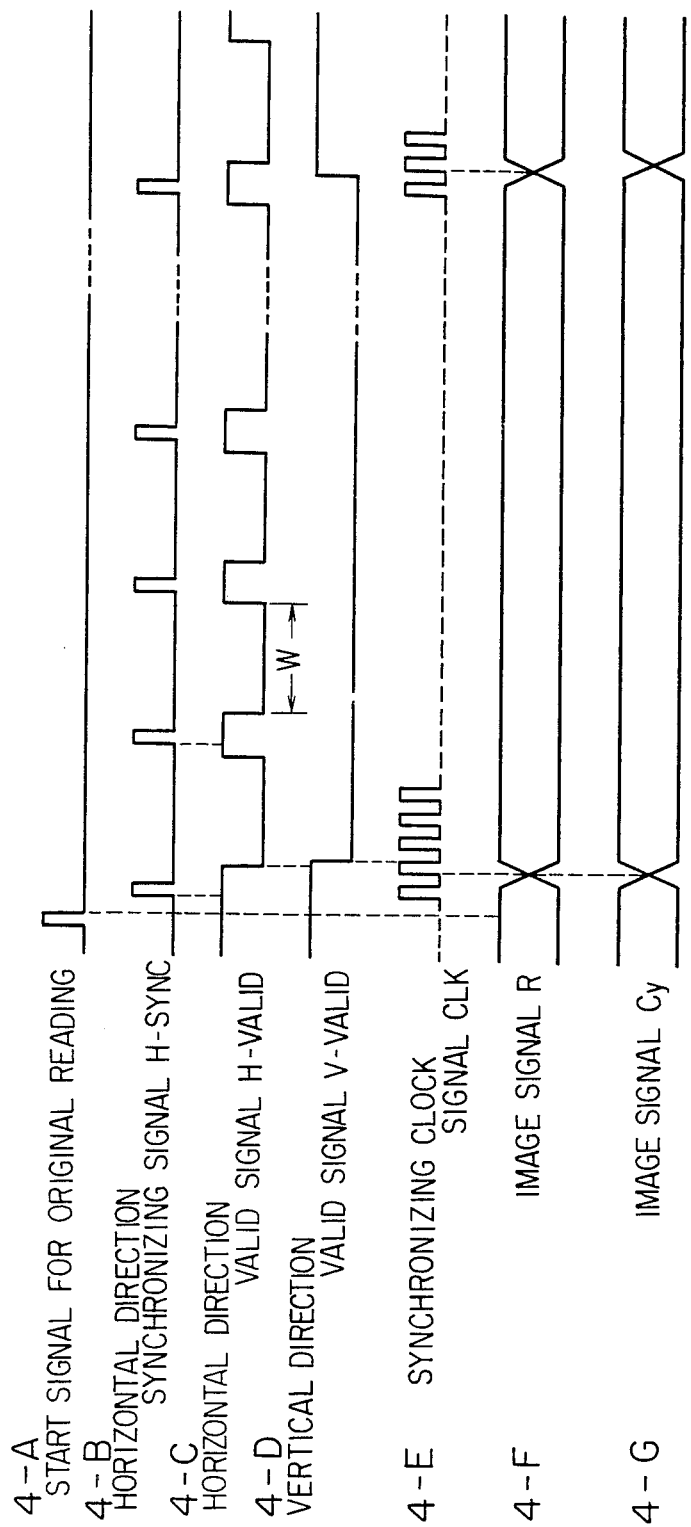
FIG. 4 is a waveform chart used for describing operation of an image reading unit in FIG. 3.

FIG. 4 illustrates the interrelation amount an image signals R and Cy, and various timing signals, whereby a horizontal direction valid signal (H-VALID) (FIG. 4-C) corresponds with the maximum draft reading width W of the CCDs 56 and 57, and the image signals R and Cy respectively shown by FIGS. 4-F and -G are read out at timing defined by a synchronizing clock signal CLK1 (FIG. 4-E).

The image signals R and Cy are supplied, via normalizing amplifiers 58 and 59, to A/D converters 60 and 61 correspondingly, where converted into a digital signal composed of a specific number of bits.

These digital image signals are subjected to shading correction. Numerals 63 and 64 represent shading correction circuits having an identical constitution. A specific example of such circuits will be described later.

The digital color image signals are supplied to a color separation circuit 150 in the next stage, thereby separated into a plurality of color signals R, B and BK which are necessary for recording a color image. These color signals R, B and BR are individually composed of color code data and density data.

Additionally, as mentioned previously, the copying apparatus of the invention used an image forming process, where one color image with a specific color is formed per one rotation of the image-carrying member 201. Correspondingly, each of the developing units 205 through 207 is selectively driven in conjunction with the rotation of the image-carrying member 201, and, simultaneously, a color signal corresponding with a selected developing unit is sequentially selected and outputted.

Incidentally, in an apparatus which reads an image by illuminating an original document with a lamp and collecting the reflected light with a lens, an unevenness in an optical image called "shading" occurs due to optical defects in the lamp, lens and the like.

Figure 5:
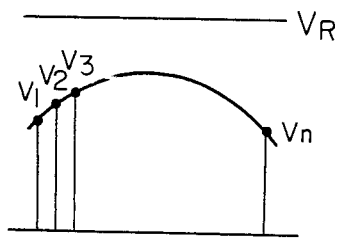
FIG. 5 is an explanatory diagram for shading correction.

With FIG. 5, when assuming the image data in the mainscanning direction are V1, V2, ... Vn, the levels are low in the both ends of the main-scanning direction. To correct such distortion, shading correction circuits 63 and 64 performs the following process.

In FIG. 5, VR represents a maximum value of image level, V1 represents an image level in the first bit among the data obtained by reading a reference white plate (unshown). When assuming the actual image level obtained by reading an image is d1, the tone level d1' of post-correction is defined as follows;

$$d1' = d1 \times VR/V1$$

Justifying the above expression, correction is performed per the image data of each pixel.

Figure 6:
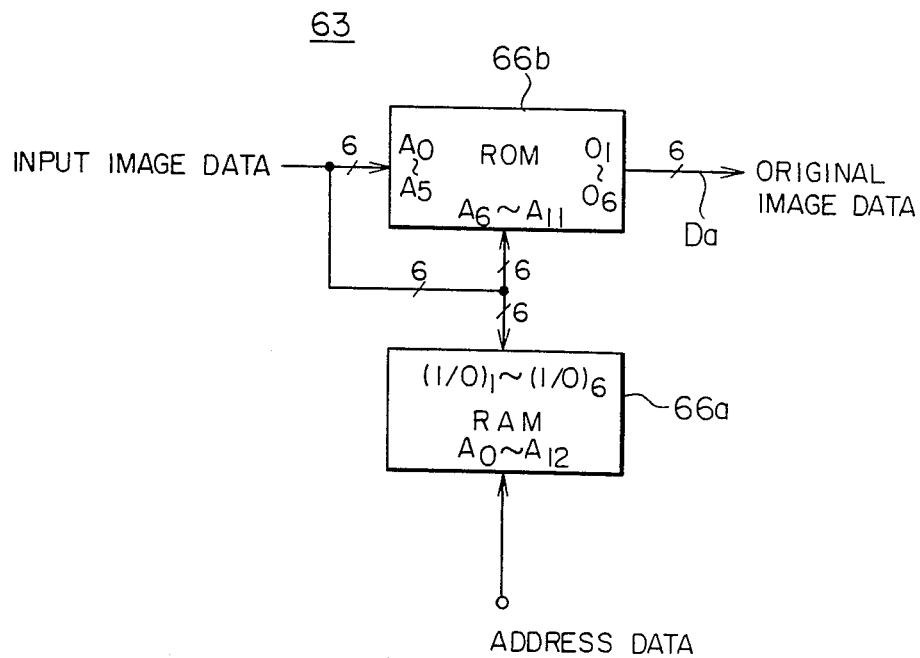
FIG. 6 a block diagram illustrating one example of a shading correction circuit.

FIG. 6 illustrates one example configuration of a shading correction circuit 63.

A first memory 66a composed of a RAM or the like is a memory for reading in a normalization signal (shading correction data) containing one line of data generated when a white reference plate is illuminated.

A second memory 66b composed of a ROM or the like is a memory for correcting, during image reading, the image data based on the shading correction data stored in the first memory 66a.

For shading correction, the image data for one line obtained by scanning the white reference plate is first stored in the first memory 66a. When an image on an original document is read, the relevant image data is supplied to address terminals A0 through A5 on the second memory 66b, and, at the same time, the shading correction data read out from the first memory 66a is supplied to the address terminals A6 through A11. Correspondingly, the second memory 66b outputs the image data into which shading correction has been incorporated in compliance with the previously stated expression for correction.

The above mentioned color separation (separation from the two color components into three types of independent color signals) is performed in accordance with the following concept.

Figure 7:
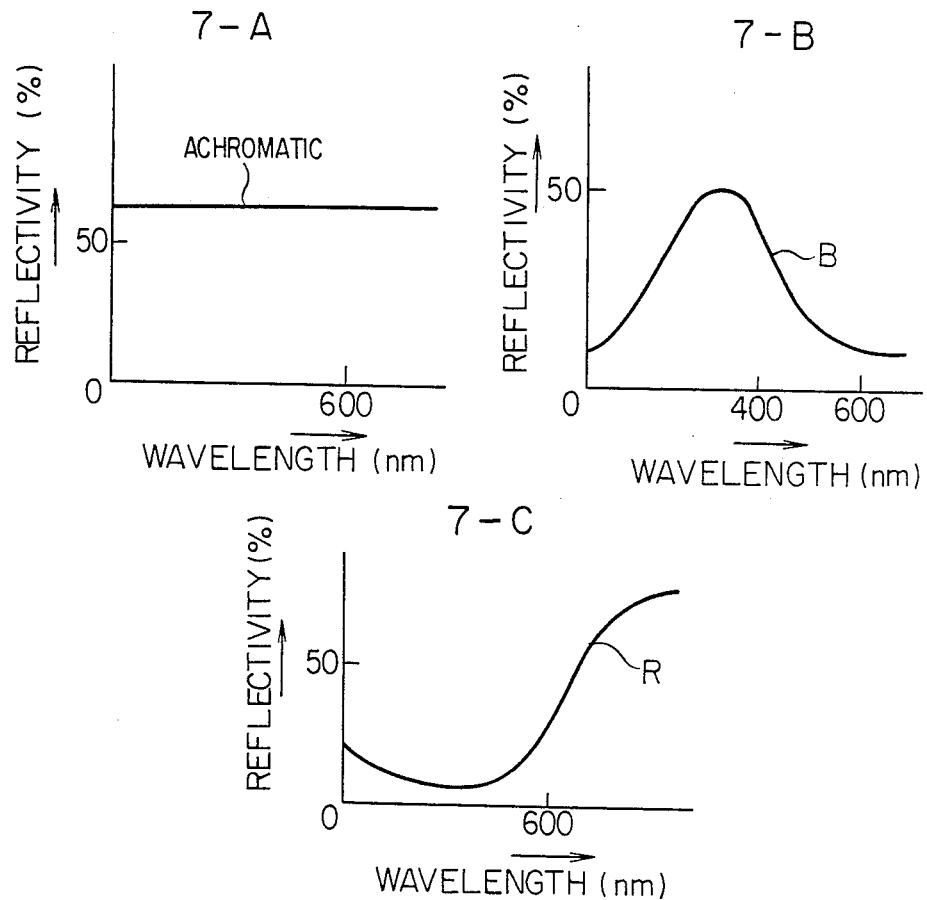
FIGS. 7-A through 7-C (collectively FIG. 7) and FIG. 8 are diagrams for describing color separation operation.

FIGS. 7-A through 7-C schematically illustrate the spectral reflectivities of color chart of independent color component. FIG. 7-A illustrates the spectral reflectivity of achromatic component; FIG. 7-B, the spectral reflectivity of blue component B; and, FIG. 7-C, the spectral reflectivity of red component R.

The horizontal axis corresponds with the wave length (nm), while the vertical axis corresponds with the relative sensitivity (%). When having a spectral neutrality at 600 nm, the dichroic mirror 55 allows the red component R to pass through and reflects the cyan component Cy.

By assuming that the level of red signal R which is normalized based on white color is VR and the level of similarly normalized cyan signal is VC, and based on a color separation map formed based on a coordinated system composed of these signals VR and VC, the color separation into red, blue and black is performed. In determining coordinate axes, the following criteria should be taken into consideration:

I. To enable the reproduction of a half-tone, the concept of reflectivity (reflection density) of original document 52 which corresponds to a luminance signal among television signals should be incorporated.

II. To incorporate the concept of color differences (including hue and chroma) in red, cyan or the like.

Accordingly, the advantageous luminance information (for example, a 5 bit digital signal) as well as the advantageous color difference signal (similarly, a five bit digital signal), are as follows:

$$\text{Luminance information} = VR + VC \qquad (1)$$

where, $$0 \leq VR \leq 1.0 \qquad (2)$$

$$0 \leq VC \leq 1.0 \qquad (3)$$

$$0 \leq VR + VC \leq 2.0 \qquad (4)$$

A total of VR and VC (VR+VC) corresponds with black level (=0) through white (=2.0). Therefore, the range 0 through 2.0 covers all the color levels.

Color difference signal
  information = VR/(VR+VC), or $$VC/(VR+VC) \qquad (5)$$

In the case of an achromatic color, a proportion between the red level VR and the cyan level VC among the whole level (VR+VC) is always constant. Accordingly, $$VR/(VR+VC) = VC/(VR+VC) = 0.5 \qquad (6)$$

Contrary, in the case of a chromatic color, for example, a red series color is expressed as follows, $$0.5 < VR/(VR+VC) \leq 1.0 \qquad (7)$$

$$0 \leq VC/(VR+VC) < 0.5 \qquad (8)$$

a cyan series color is expressed as follows, $$0 \leq VR/(VR+VC) < 0.5 \qquad (9)$$

$$0.5 < VC/(VR+VC) \leq 1.0 \qquad (10)$$

Accordingly, by using a coordinate system composed of a two coordinate axes, (VR+VC) and VR/(VR+VC), or (VR+VC) and VC/(VR+VC), the chromatic colors (red and blue) are definitely separated from an achromatic color, simply by means of level comparison process.

Figure 8:
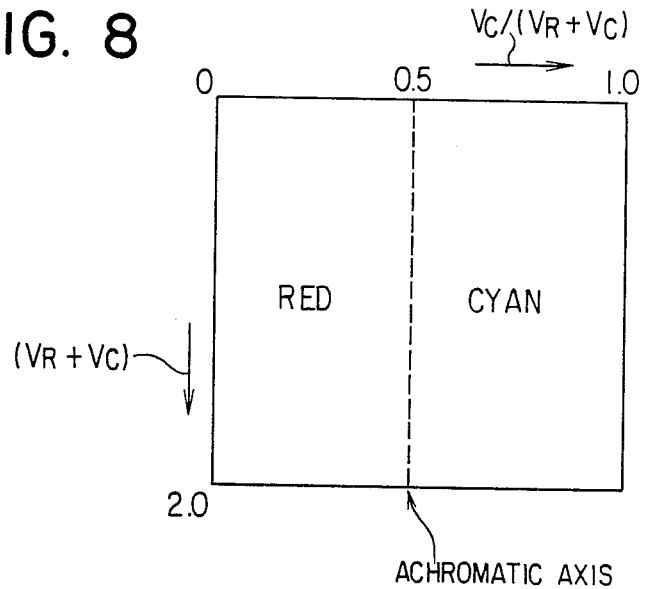

FIG. 8 illustrates a coordinate system which has a vertical axis representing a luminance signal component (VR+VC), as well as a horizontal axis representing a color difference signal component VC/(VR+VC).

When using the color difference signal component of VC/(VR+VC), the range smaller than 0.5 is for a red series color R, and the range larger than 0.5 is for a blue series color B. Achromatic colors are included both in the vicinity of color-difference single information = 0.5 and in an area which contains smaller number of luminance signal data.

In this way, by detecting the levels of red signal R and cyan signal Cy, the three independent color signals (red, R; blue, B; black, BK) may be outputted based on the color information signal corresponding with an original color document.

Figure 9:
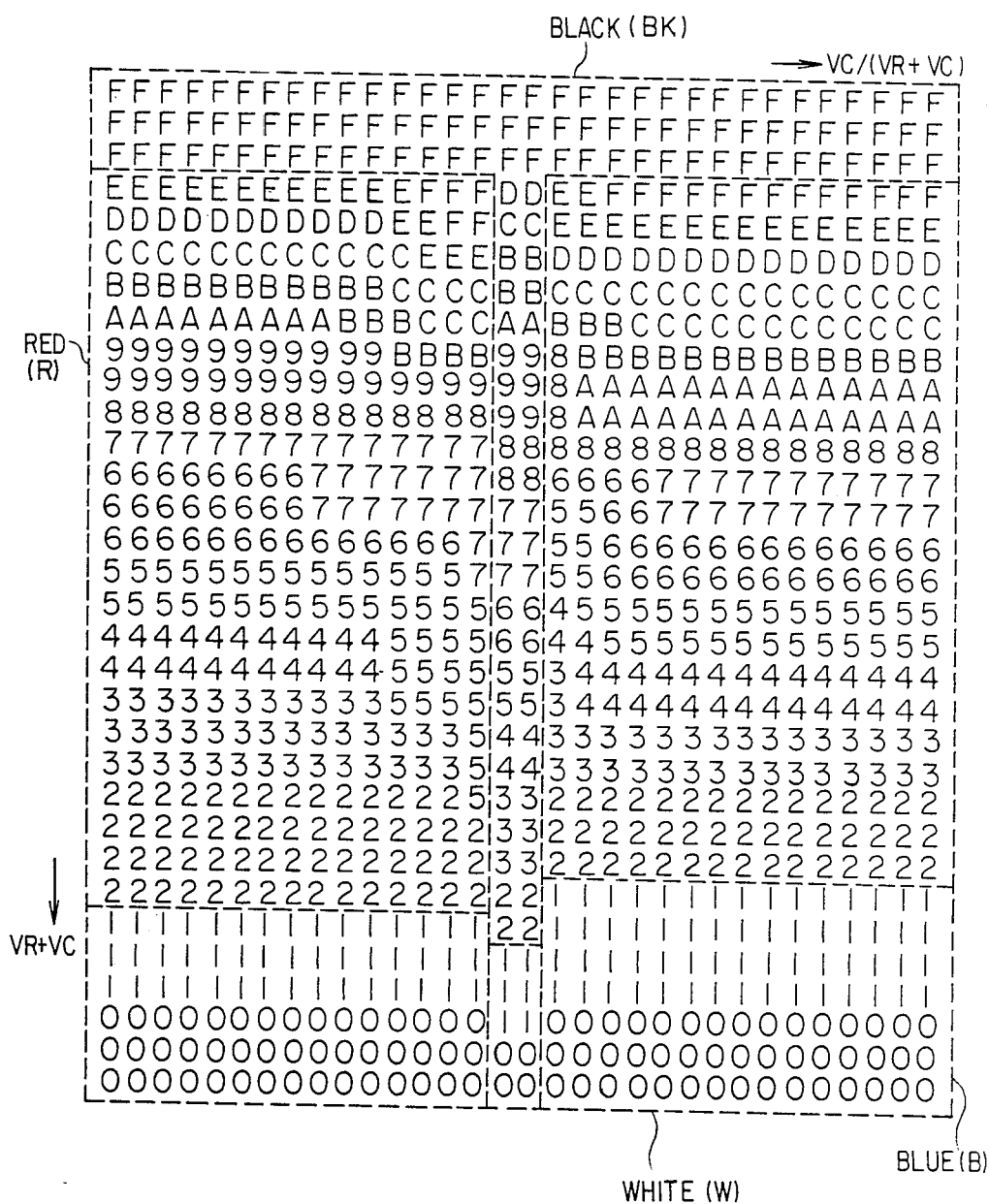
FIG. 9 illustrates one example of a color extraction.

FIG. 9 shows a specific example of a color separation map, wherein color classification has been performed in compliance with such a color separation process. This ROM table stores quantized density-corresponding values which have been derived from the reflective densities on the original document 52. This example is a color separation table having 32×32 blocks.

An actual image processing apparatus has a plurality of ROMs corresponding with a number of independent colors, wherein each ROM stores map data for each color. The details are described later.

Figure 10:
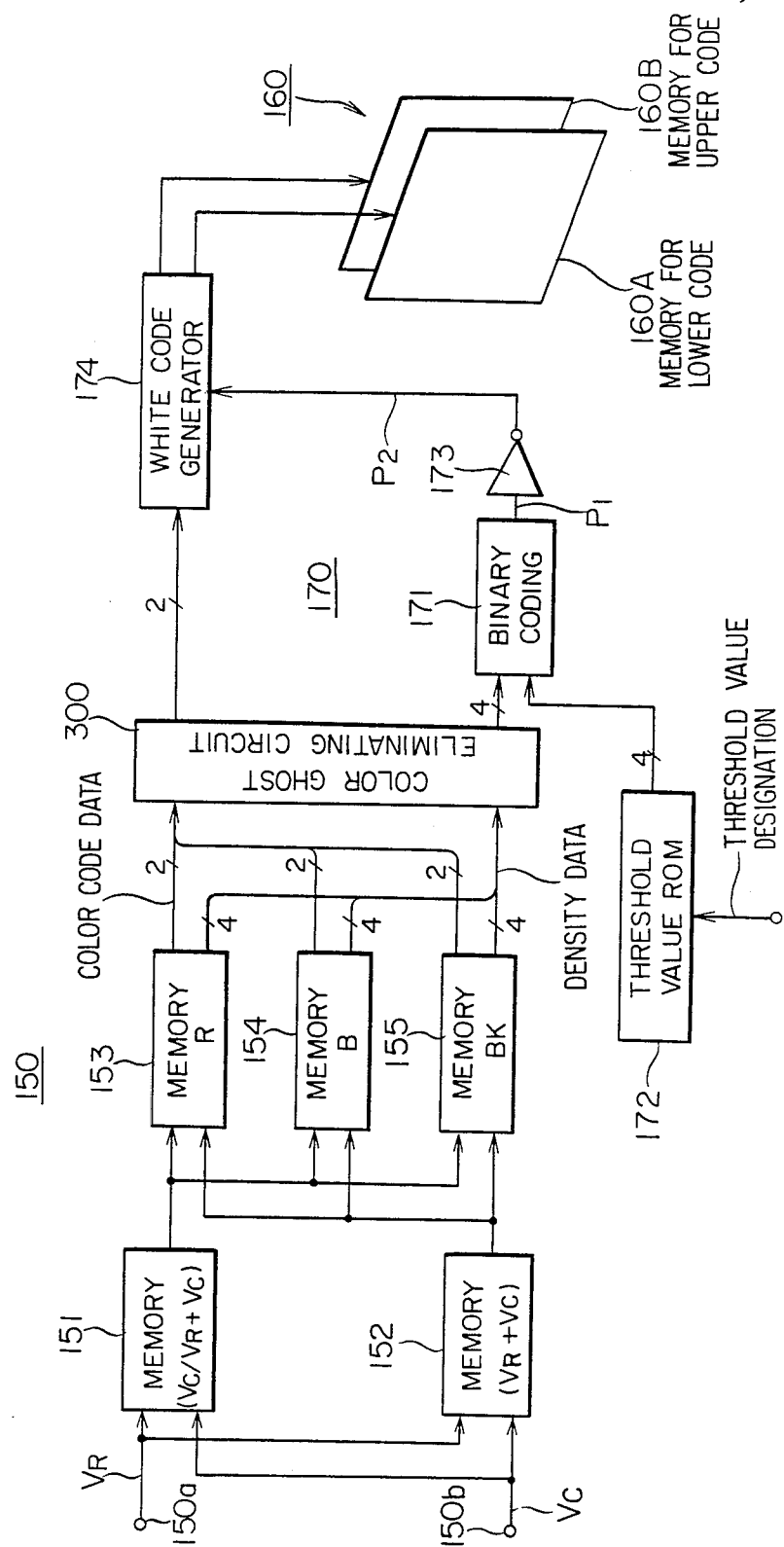
FIG. 10 is a block diagram illustrating one example of a color extraction circuit which is a principal area of signal processing system according to the invention.
Figure 13:
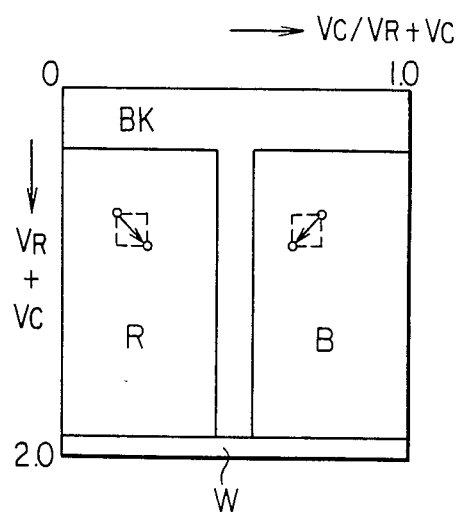
FIGS. 13 and 14 are explanatory diagrams respectively illustrating a color-ghost.

FIG. 10 is a block diagram showing the principal area of one example of a color separation circuit 150 to enable the above color separation process.

In this figure, to terminals 150a and 150b are correspondingly supplied the red signal R and cyan signal Cy, before the color separation into three colors. These color signals may be signals into which tone conversion, γ correction and the like having been incorporated.

The post-arithmetic operation data is used not only as an address signal being supplied to a memory 152 which stores the arithmetic result of (VR+VC) for determining the luminance signal data but as an address signal being supplied to a memory 151 which stores the arithmetic result of color difference signal data VC/(VR+VC).

The output from each of these memories 151 and 152 is used as an address signal for the separation memories (ROM-configured) 153 through 155. The memory 153 is associated with the red signal R; the memory 154, the blue signal B; and the memory 155, the black signal BK.

The memories 153 through 155 independently stores data of color separation map, that is, density data (4-bit configured), as well as each of the following color code data (2-bit configured).

As mentioned above, when using red and blue as achromatic colors, each color information is represented by two bits. Correspondingly, if
White=(1, 1)=3
Black=(0, 0)=0
Red=(1, 0)=2
Blue=(0, 1)=1

The density expressed by D in FIG. 9 is not individually stored in each of the memories 153 through 155 but stored together with each of color codes 1, 2, 3 and 4 in each of the memories 153 through 155. Accordingly, each memory stores the data in the following manner;
0D ... Black (memory 155)
2D ... Red (memory 153)
1D ... Blue (memory 154)

In each data, the upper two bits represent the color code data; and the lower four bits represent the density data.

FIGS. 11-A through 11-C jointly illustrate in what a manner data are stored, wherein an area shaded with oblique lines represents an area for storing data, and X indicates the density data. The density data is represented in hexadecimal notation.

An area other than that of oblique lines stores the white color code data "30".

The image data (color code data and density data) sequentially read out from each of the memories 153 through 155 are supplied to the color-ghost elimination circuit 300, where subjected to the ghost elimination process.

Those subjected to the color-ghost elimination process for color information are the color code data and the density data. Subsequently, the revised color code data in turn revises the color information, and the revised density data in turn revises the level of color information.

The density data among the image data outputted from a color-ghost elimination circuit 300 is binary-coded by a binary-coding means 171 which constitutes a stored data processing circuit 170.

If the above binary-coded density data exists, the memory 160 records a color code corresponding with the density data.

If no binary-coded density data exists, the memory 160 records a color code corresponding with white.

Correspondingly, as shown in FIG. 10, the color code data read out from the memories 153 through 155 are supplied to a white code generator 174, and, at the same time, the binary coded data is phase-inverted by an inverter 173 and then supplied to the white code generator 174 as the control signal thereof.

If no binary-coded density data exists, that is, if the background color of original document is white, the binary-coding means 171 generates binary coded data "L"; this allows color code data to be unconditionally converted into and outputted as white color code data, regardless of what type the color code data is.

If the binary-coded density data exists, the inputted color code data is unchangingly outputted.

As the white code generator 174, a logic circuit or a ROM may be used. When using a logic circuit, the truth table should comply with that of FIG. 12.

As explained above, the density data as well as the color code data are respectively converted into 2-bit configured image data (hereinafter referred to as storage data) and outputted from the white code generator 174. Therefore, it is convenient to use, as the memory 160 for storing the storage data, two memory planes 160 A and 160 B as shown in FIG. 10.

With this arrangement, when the one memory 160 A is used as a memory for storing lower bits among the stored data, the other memory 160 B is used as a memory for storing the upper bits.

Additionally, one memory plane is capable of storing binary coded data of an image having a required size. As a memory plate, a dynamic RAM or static RAM may be used.

As described above, when color information is stored in the form of color code data, the capacity of memory plane is expressed as follows;

$$297 \text{ mm} \times 210 \text{ mm} \times (16 \text{ dots/mm})^2 \times 2 \text{ bits}$$
$$= 31933440 \text{ bits}$$
$$\approx 4 \text{ M bytes}$$

This means a memory 160 having an unconventionally small capacity may serve the same function.

Contrary, when color information is unchangingly stored, for example for three color recording, a required capacity will be as follows;

$$297 \text{ mm} \times 210 \text{ mm} \times (16 \text{ dots/mm})^2 \times 3 \text{ colors}$$
$$= 47900160 \text{ bits}$$
$$\approx 6 \text{ M bytes}$$

In this way, the 2-bit color code system allows the image data to be stored in four colors. Similarly, a 3-bit color code system allows the image data to be stored up to in eight colors (including white). According to the latter system, with the image processing method of the invention, only three memory planes of which number corresponds with the number of color code bits satisfies the requirement for image data storing, in contrast to a conventional method which requires as many as seven memory planes. In essence, such an arrangement of the invention reduces a storing capacity of memory 160 to less than ½.

Next, the color-ghost elimination process is described below.

First, one example of a color-ghost, for which the fluctuation in output level of a CCD, is described.

As is in the above case, where color separation is performed based on the arithmetic operation for CCD output level, each output level commonly varies by Δ, for example.

Correspondingly, the luminance signal component deviates from the normal level by 2Δ, and the color difference signal component deviates;

$$\{VR-VC/(VR+VC)^2\}\Delta$$

This fluctuation in level results in the fluctuation in data addresses of color separation memories 153 through 155. More specifically, in the case of storing red data, original addresses in the memories 151 and 152 shift to higher addresses.

In the case of storing blue data, the level of color difference signal drops.

Figure 14:
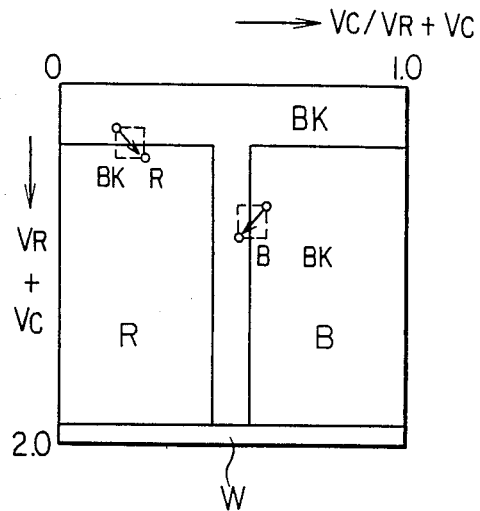

Accordingly, when a specific area on an original document and having a specific color is in the vicinity of edge of the whole area of the color, the color and level (density value) in the specific area will deviate due to the above mentioned fluctuation in the output level, as shown in FIG. 14. In this way, an area having an undesirable color occurs. In the present invention, the occurrence of undesirable color area is called "the occurrence of color-ghost".

The misaligned CCD, or another reason, also causes the color-ghost. However, the description of this type of color-ghost is omitted.

Figure 15:
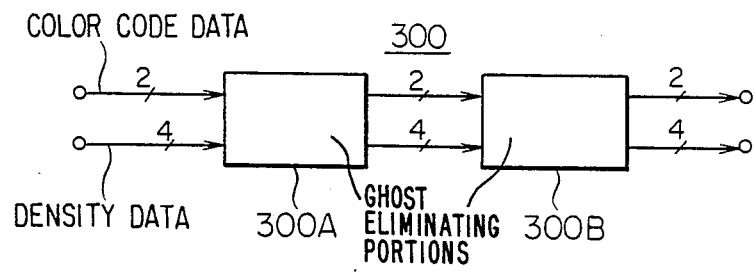
FIG. 15 is a block diagram illustrating a concept of color-ghost elimination circuit.

The color-ghost elimination circuit is composed of, as illustrated in FIG. 15, a first ghost elimination portion 300A and a second ghost elimination portion 300B which is connected in serial to the former. These portions have an identical constitution. Therefore, only one of them is described below.

The color-ghost elimination process is performed not only in the main-scanning direction (horizontal scanning direction), but the sub-scanning direction (vertical scanning direction) which corresponds with the rotational direction of the image-carrying member 201.

With the example color-ghost elimination circuit in FIG. 16, N=4, and M=7. Correspondingly, using image data of seven pixels in horizontal direction by seven lines in vertical direction, the color-ghost both in the horizontal and vertical directions is eliminated.

The color codes read out from the memories 153 through 155 are sequentially supplied to a 7-bit configured shift register 301, where converted into parallel data. The parallel color code data for seven pixels are supplied to a ROM 302 which is for eliminating the ghost in the horizontal direction, where subjected to the ghost elimination process on the pixel-by-pixel basis.

Correspondingly, the ROM 302 stores at least post-ghost elimination color code data which correspond with the number of reference color patterns (16384 color patterns) composed of seven pixels. In this example, in addition to the post-ghost elimination color code data, the ROM 302 stores all the sets of color code data which respectively constitute a post-estimation color pattern.

As FIG. 14 illustrates, if an original document is black-colored, a specific area erroneously turns red or blue; if an original document is red or blue-colored, a specific area erroneously turns black. Accordingly, based on such a characteristic derived from the nature of color separation map, the color of object pixel is estimated using color information on a corresponding color pattern.

Figures 17, 18:
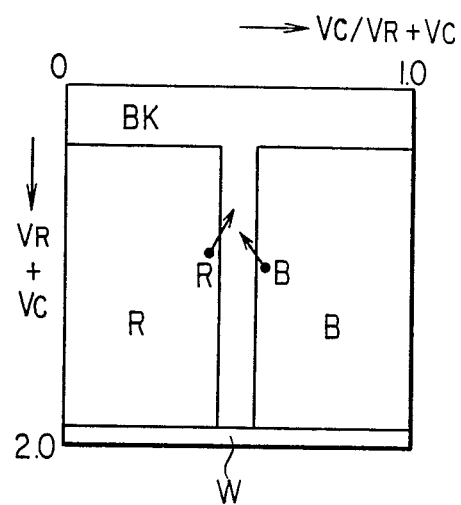
FIG. 17 is a diagram illustrating a logical operation in the course of a color-ghost elimination by the color-ghost elimination circuit in FIG. 16.
FIG. 18 is an explanatory diagram illustrating a density correction operation by the color-ghost elimination circuit in FIG. 16.

FIG. 17 shows the contents of some color patterns. In this figure, among each set of seven pixels, a pixel in the middle is an object pixel which is subjected to the color-ghost elimination process, whereby the object pixel is modified and outputted as listed in this figure.

Once the ghost elimination is completed, the color code data is latched with a latch circuit 303.

As shown in FIG. 16-a, the density data outputted from the memories 153 through 155 are supplied to latch circuit 306 through shift register 305 for timing adjustment, and then the data transfer condition is so set as to serially transfer the density data following the color code data.

Incidentally, as shown in FIG. 16-b illustrating preferable embodiment according to the invention, for reducing the density fluctuation, the density data outputted from the memories 153 through 155 are supplied to density correction circuit 350 for the main-scanning direction, via a 5-bit configured shift register 305 for timing adjustment.

As shown in the figure, the density correction circuit 350 comprises a ROM 351 which stores density correction data and a comparator circuit 352 for color code data.

The case which requires the density correction is a case where the pre-color-ghost elimination color code data differs from the post-color-ghost elimination color code data. Accordingly, the color code data of an object pixel being supplied to the ROM 303 as well as the color code data outputted from the ROM 302 are supplied to the comparator circuit 352, where whether or not both the color code data accord with each other is detected.

If both the color code data accord with each other, which means that there is no color-ghost occurred, the density data having been inputted to the ROM 302 is outputted unchangingly.

If both the color code data do not accord with each other, which means that there is a color-ghost occurred and original color information has been erroneously modified, the density data being outputted from the ROM 351 is selected. Thus the post-correction density data is outputted.

When a specific portion turns red or blue as a result of color-ghost occurred, this portion is turned black for correction, in compliance with the characteristic of the above color separation map. Theoretically, black pixels converted from red or blue pixels, as mentioned above, are the pixels on the edge portion. The density values of these pixels are shifted toward black side and higher level, in order to prevent the edge portion from becoming an excessively fine line and to eliminate ruggedness in the black edge portion.

More specifically, as indicated by an arrow in FIG. 18, to satisfy the above requirement, correction should be made so that an address corresponding with the luminance level become smaller. The satisfactory degree of correction is one to three addresses.

If a black ghost appears, it is turned red or blue as correction; the designed corrected level is reverse to the above correction example. To which level the level of post-correction color should be varied is determined by referring both the color code data outputted from the ROM 302 and the pre-correction density data.

The density data having been subjected to the density correction is supplied to a latch circuit 306 where data transfer timing is determined so that the density data is transferred serially following the color code data.

Converted into serial data signal, the color code data as well as density data are supplied to a group of line memories 310 in the next stage.

The group of line memories 310 are provided to eliminate a color-ghost in the vertical direction by using the image data for seven lines. The group of line memories include eight lines; this is because an extra one line capacity is necessary to allow real time ghost elimination.

The color code data and density data for eight lines are separated in a group of gate circuits 320 in the next stage. The group of gate circuits 320 include gate circuits 321 through 328 which correspond with the line memories 311 through 318.

The data for eight line memories converted into parallel data by the group of line memories 310 are respectively separated into the color code data and density data by the group of gate circuits 320, thereby the separated color code data is supplied to a data selection circuit 320, which selects color code data, necessary for color-ghost elimination, of seven line memories among eight line memories. In this course, if the line memories 311 through 317 are selected, the line memories 312 through 318 are selected at the next processing timing; in this way, the line memories being selected are sequentially shifted.

Selected and converted into parallel data, the color code data of seven line memories are supplied to a following ROM 340 for eliminating a ghost in the vertical direction, thereby the color-ghost in the vertical direction is eliminated.

Next, the color code data are latched by a latch circuit 341.

On the other hand, the density data having been separated by the group of gate circuits 320 is, via a density correction circuit 360 for vertical direction, supplied to a latch circuit 342 which outputs the density data after aligning it for timing with the color code data.

The ROM 340 also stores estimated color code data which correspond with the number of color patterns (16384 patterns) similar to those mentioned previously.

The density correction circuit 360 has a constitution similar to the density correction circuit 350 for the horizontal direction, and comprises a density correction ROM 361 for the vertical direction and a comparator circuit 362. This density correction circuit 360 performs density correction with pixels having been subjected to the color-ghost elimination.

The density correction in the vertical direction is identical with the density correction in the horizontal direction, and is not specifically described.

The ghost elimination process both in the main-scanning direction and the sub-scanning direction is again performed by a second ghost-elimination portion 300B. Repeating the ghost elimination twice completes the ghost elimination process, with the same effect as M=9.

Figure 19:
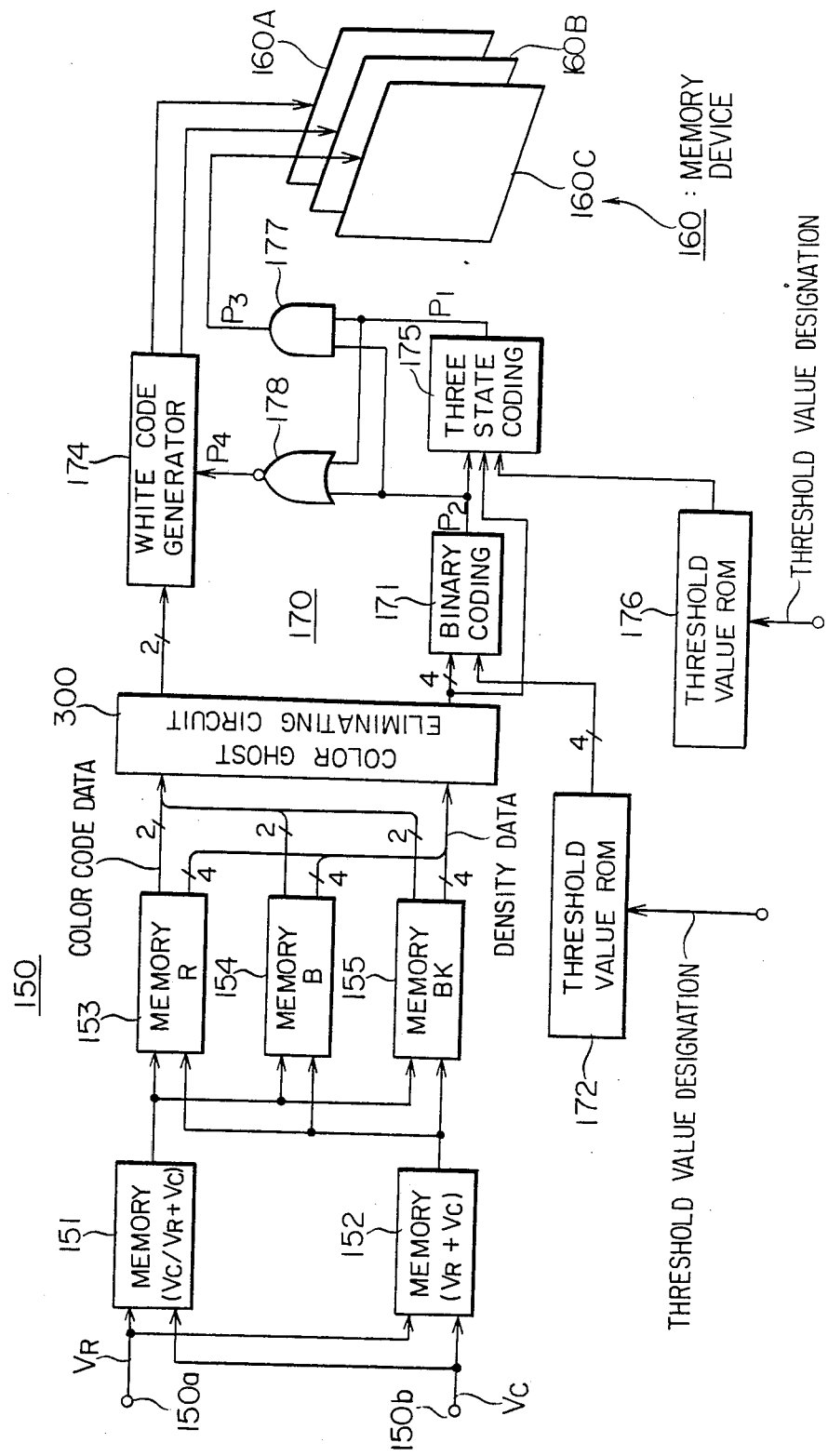
FIG. 19 is a block diagram schematically illustrating another example of a color extraction circuit in FIG. 10.

FIG. 19 illustrates an apparatus according to the invention, wherein the density data is ternary-coded.

Usually, indicating a ternary-coded data requires at least two bits. However, the color code includes a white color code; this feature allows ternary-coded data to be indicated using one bit.

More specifically, with a ternary code other than white code, a level "H" is regarded as a ternary level; a level "L" is regarded as a binary level. Correspondingly, a binary-code is positively differentiated from a ternary code by one bit data.

However, a color code requires two bits, as is in the previously mentioned case. In summary, data for one pixel is expressed with three bits including a color code. As a result, according to this arrangement, using only three memory planes storage of up to three ternary-coded images in three independent colors. Otherwise, with a conventional method, three binary-coded images in three independent colors may be stored at the maximum.

To satisfy this requirement, a stored data processing circuit 170 has a configuration shown in FIG. 19.

Binary-coded data P2 having been binary-coded by a binary-coding means 171, together with 4-bit configured density data, are supplied to a ternary-coding means 175, thereby the binary-coded data P2 is ternary-coded based on the threshold value data transmitted from a threshold value ROM 176. Ternary-coded data P1, together with the binary-coded data P2, are supplied to an AND circuit 177, thereby a 1-bit output from the AND circuit 177 is stored in a third memory plane 160c. Based on the data content of P3, binary-coded data is differentiated from ternary-coded data.

The ternary-coded data P1 as well as the binary-coded data P2 are also supplied to a NOR circuit 178, thereby an output from the NOR circuit 178 controls a white code generator 174.

The correlation among data P1 through P4 is shown in FIG. 20. Though these data are in fact chromatic color information, this table lists, for convenience of description, the examples, where ternary-coded levels represents luminance information for three achromatic colors (white, black and grey).

In this table, a white level corresponds with the level of P4, "H". Accordingly, a white code is obtained from the white code generator 174, in a manner identical with that in FIG. 12. In this course, the level of P3 is "L".

In the case of grey level, the levels of P4 and P3 are "L"s; an inputted color code is unchangingly stored in the memory planes 160a and 160b. Accordingly, the level of the lower code in the color code remains at "L".

In the case of black level, the level of P3 is "H" and the level of P4 is "L"; the color code is unchangingly stored in the memory planes 160a and 160b. Accordingly, the level of the lower code in the color code is "H". This feature clearly indicates the black level is a ternary-coded level.

Such a color image processing apparatus too has a color-ghost elimination circuit 300, whereby color code data as well as density data are individually subjected to the ghost elimination process, as mentioned already.

In the above example, the ghost elimination is performed twice using the first and second ghost-elimination portions 300A and 300B. However, the ghost-elimination may be repeated n times continually.

It should be noted that the types of color information to which original image information is separated are not necessarily limited only to three.

As can be understood from the description above, and according to the present invention, an original color image is first separated into a plurality of color signals, whereby the color-ghost elimination is repeated continually using a smaller number of color patterns.

With such an arrangement, the color-ghost elimination satisfying a requirement for practical use is achieved with a smaller number of patterns which store data for ghost elimination.

As a result, a ROM having a much smaller capacity may serve the ghost-elimination purpose, and which realizes a highly cost effective color image processing apparatus.

Furthermore, according to such an arrangement, a fine line is not reproduced as an excessively fine line, and an edge portion is free from ruggedness, because not only color code data but density data are corrected in compliance with the status of color-ghost. This feature ensures an improved image quality. Such a type of density processing is important processing, since most documents are written in black characters and reproducing black color is an outstanding criterion.

Additionally, according to the invention, original image data is separated into color code data and density data. This arrangement enables single circuitry perform image processing such as enlarging or reducing operation following the above image separation process.

Conventionally, the color-ghost elimination was performed after the binary-coding step; it was necessary that an enlarging or reducing process be performed per individual color. Correspondingly, the more the number of separated colors, the more complicated a circuit constitution is.

According to one arrangement of the invention, when separating an original color image into a plurality of signals each bearing information for an independent color, the data of one pixel is first separated into color code data and density data, both of which are next individually stored in a specific memory, and finally stored in a recording device in the form of stored data. With this arrangement, the storing device stores both the color code data and multi-value-coded data (binary-coded data or ternary-coded data).

In essence, with this arrangement of the invention, the memory capacity required for an external storage device is much smaller than a conventional device. The effect of the invention is more apparent with an increased number of independent colors into which original image is separated, because the memory capacity is more effectively utilized especially in regard to an increased number of independent color signals.

What is claimed is:

1. Apparatus for processing a color original image which comprises
   (1) means for reading a color original image to generate a plurality of color component signals for each pixel of said original image;
   (2) means for processing said color component signals to generate a plurality of color image signals wherein each of said color image signals comprises color code data and density data;
   (3) means for eliminating a color ghost from said color code data, said color ghost eliminating means storing corrected color code data whereby said color ghost eliminating means outputs corrected color code data in accordance with said color code data, and;
   (4) means for correcting said density data in accordance with said corrected color code data.

2. The apparatus of claim 1 wherein said color ghost eliminating means comprises a first and a second ghost eliminating portion.

3. The apparatus of claim 1 wherein said color ghost eliminating means eliminates a color ghost in both horizontal and vertical scanning directions of said apparatus.

4. The apparatus of claim 1 wherein said corrected density data is converted to binary-coded density data.

5. The apparatus of claim 4 wherein said corrected color code data is controlled by said binary-coded density data.

6. The apparatus of claim 1 wherein said corrected density data is converted to tri-state coded density data.

7. The apparatus of claim 6 wherein said corrected color code data is controlled by said tri-state coded density data.

* * * * *